US012722425B2

(12) United States Patent
Fukushima

(10) Patent No.: US 12,722,425 B2
(45) Date of Patent: Sep. 1, 2026

(54) MOTORCYCLE TIRE AND MOTORCYCLE TIRE SET

(71) Applicant: SUMITOMO RUBBER INDUSTRIES, LTD., Hyogo (JP)

(72) Inventor: Kazuki Fukushima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 19/214,924

(22) Filed: May 21, 2025

(65) Prior Publication Data

US 2025/0381803 A1 Dec. 18, 2025

(30) Foreign Application Priority Data

Jun. 12, 2024 (JP) ................................ 2024-095288

(51) Int. Cl.
*B60C 11/00* (2006.01)
*B60C 11/03* (2006.01)

(52) U.S. Cl.
CPC ...... *B60C 11/0058* (2013.01); *B60C 11/0083* (2013.01); *B60C 11/0332* (2013.01); *B60C 2011/0025* (2013.01); *B60C 2200/10* (2013.01)

(58) Field of Classification Search
CPC ............. B60C 11/0058; B60C 11/0083; B60C 11/0332; B60C 2011/0025
See application file for complete search history.

(56) References Cited

U.S. PATENT DOCUMENTS

| | | | | |
|---|---|---|---|---|
| 2006/0207701 A1* | 9/2006 | Tanaka | B60C 11/00 152/209.5 |
| 2018/0312007 A1* | 11/2018 | Shibamoto | B60C 9/2204 |

FOREIGN PATENT DOCUMENTS

| | | | | |
|---|---|---|---|---|
| EP | 2662226 A1 * | 11/2013 | B60C 11/033 |
| EP | 4265436 A1 | 10/2023 | |
| JP | 10-193918 A * | 7/1998 | |
| JP | 2008-143351 A * | 6/2008 | B60C 11/0058 |
| JP | 2013-139192 A | 7/2013 | |
| JP | 2016-222060 A | 12/2016 | |
| JP | 2023-160726 A | 11/2023 | |

OTHER PUBLICATIONS

Machine translation for Japan 10-193918 (Year: 2026).*
Machine translation for Japan 2008-143351 (Year: 2026).*
Extended European Search Report in related application No. 25157254.1, dated Jul. 7, 2025.

* cited by examiner

*Primary Examiner* — Steven D Maki
(74) *Attorney, Agent, or Firm* — Greenblum & Bernstein, P.L.C.

(57) ABSTRACT

A motorcycle tire comprises a tread rubber including a crown rubber disposed in a crown region and a pair of shoulder rubbers extending to tread edges. A complex elastic modulus of the crown rubber is smaller than complex elastic moduli of the shoulder rubbers. Ground contacting areas A0, A10 and A40 of the tire which occur when the tire under a regular state is placed on a flat horizontal plane at camber angles of 0, 10 and 40 degrees and loaded with a regular tire load, satisfy the following conditional expressions:

$$0.3 =< (Ec^* \times A0)/(Es^* \times A40) =< 1.05, \text{ and}$$

$$0.95 =< A10/A0 =< 1.05.$$

19 Claims, 2 Drawing Sheets

1
1F,1R
S
TW
Wc
2
Sh
2s
Te
3
4
5
6
7
11
e1
2G,10
C
d1
dA
Cr
d2
dB
c1

MOTORCYCLE TIRE AND MOTORCYCLE TIRE SET

TECHNICAL FIELD

The present disclosure relates to a motorcycle tire and a set of motorcycle tires as a front wheel tire and a rear wheel tire of a motorcycle.

BACKGROUND ART

Patent Document 1 below discloses a motorcycle tire in which a tread portion is provided with a base rubber layer and a cap rubber layer disposed on the radially outer side of the base rubber layer. The cap rubber layer comprises a center section and shoulder sections located axially outside the center section. The rubber hardness of the base rubber layer, and those of the center section and shoulder sections of the cap rubber layer are specifically-defined.

Patent Document 1: Japanese Patent Application Publication No. 2016-222060

SUMMARY OF THE INVENTION

Problems to be Solved by the Invention

The above-described motorcycle tire is described as having excellent transient property.

In recent years, on the other hand, in addition to such excellent transient property, in order to reduce the rider's effort, it is also required for the motorcycle tires to have nimble handling in the initial stage when a motorcycle begins to roll where the camber angle is small (hereinafter, the initial stage nimbleness), and stable handling from the middle stage to late stage of rolling where the camber angle is large (hereinafter, the middle stage stability).

In view of the above circumstances, the present disclosure was devised, and a primary objective of the present disclosure is to provide a motorcycle tire and a set of motorcycle tires in which the initial stage nimbleness, middle stage stability and transient property are improved.

Means for Solving the Problems

According to the present disclosure, a motorcycle tire comprises:

a tread portion having a pair of tread edges; and a tread rubber forming a ground contacting surface of the tread portion, wherein the tread rubber includes:

a crown rubber disposed in a crown region including the tire equator; and a pair of shoulder rubbers disposed one on each side of the crown rubber in the tire axial direction, and extending to the tread edges, respectively, a complex elastic modulus Ec* of the crown rubber is smaller than a complex elastic modulus Es* of each of the shoulder rubbers, and when the motorcycle tire under a regular state in which the tire is mounted on a regular rim and inflated to a regular internal pressure, is placed on a flat horizontal surface, by applying a regular tire load, ground contact areas A0, A10 and A40 of the tire at tire camber angles of 0 degrees, 10 degrees and 40 degrees, respectively, satisfies the following conditional expressions:

$$0.3 <= (Ec^* \times A0)/(Es^* \times A40) <= 1.05; \text{ and}$$

$$0.95 <= A10/A0 <= 1.05.$$

Effects of the Invention

In the motorcycle tire according to the present disclosure, by adopting the above-described configurations, the initial stage nimbleness, middle stage stability and transient property can by improved.

DETAILED DESCRIPTION OF THE INVENTION

An embodiment of the present disclosure will now be described in detail in conjunction with the accompanying drawings.

The drawings may contain exaggerations and dimensional ratios different from the actual ratios in order to aid the understanding of the present disclosure.

Motorcycle Tire

Figure 1:
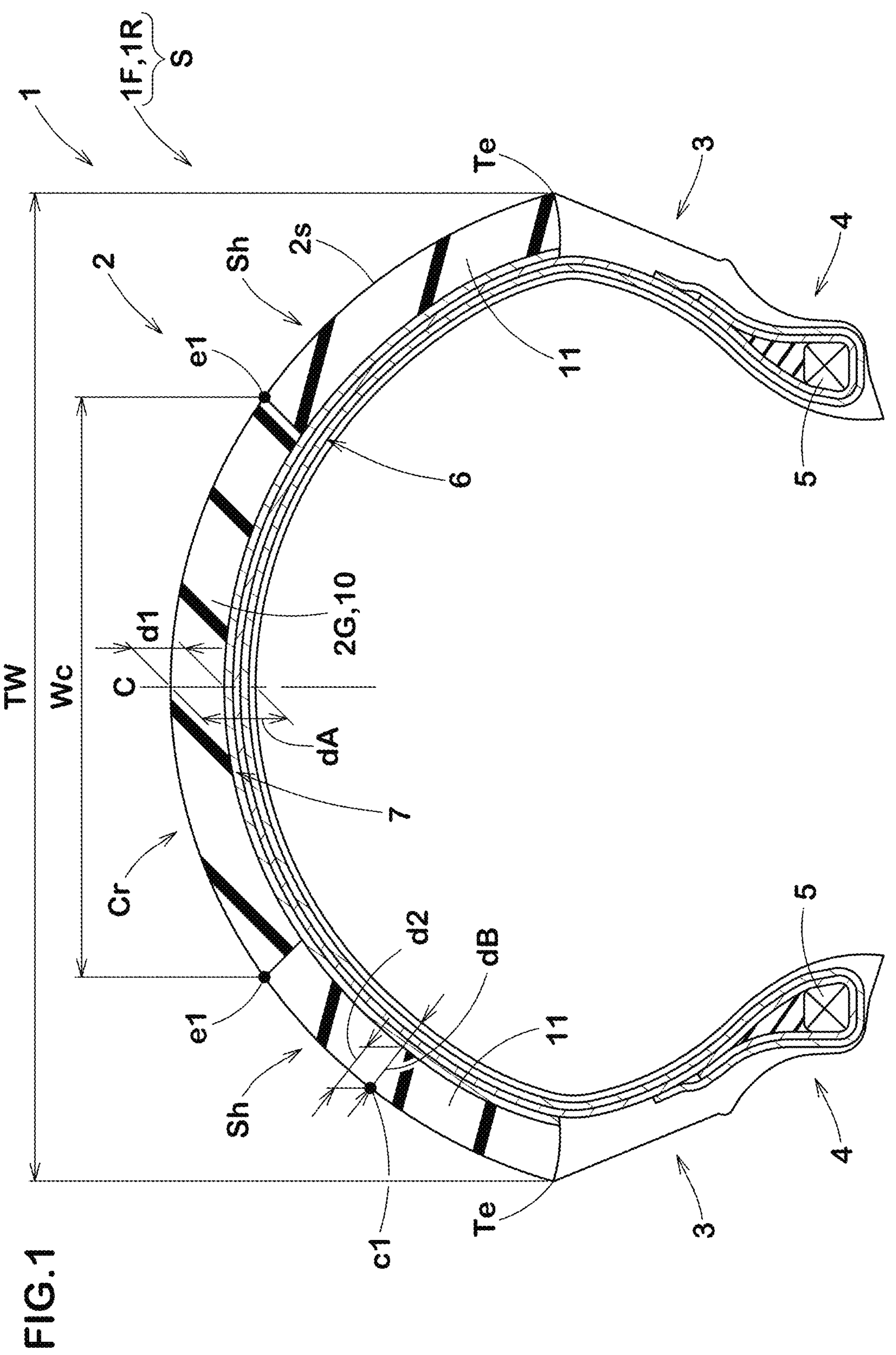
FIG. 1 is a tire-meridian cross-sectional view of a motorcycle tire as an embodiment of the present disclosure.

FIG. 1 is a tire-meridian cross-sectional view including a tire rotation axis (not shown), showing a motorcycle tire 1 as an embodiment of the present disclosure (hereinafter sometimes simply referred to as the "tire 1").

Shown in FIG. 1 is a pneumatic tire for on-road use as a preferred embodiment.

This tire 1 can be designed to be suitable for both a front wheel tire 1F and a rear wheel tire 1R of a motorcycle.

Such front wheel tire 1F and rear wheel tire 1R constitute a set S of motorcycle tires for a motorcycle.

In this application, a dimension of each portion of the tire 1 refers to a value measured in the regular state unless otherwise noted.

The "regular state" is an unloaded state of the tire 1 which is assembled on a regular rim (not shown) and of which internal pressure is adjusted to a regular internal pressure in the case that the tire 1 is a pneumatic tire.

The "regular rim" is a wheel rim which is, in a standard system including standards on which the tire 1 is based, specified for the tire by the standards, for example, the "Standard rim" in JATMA, "Design Rim" in TRA, and "Measuring Rim" in ETRTO.

The "regular internal pressure" is air pressure which is, in a standard system including standards on which the tire 1 is based, specified for the tire by the standards, for example, the "maximum air pressure" in JATMA, the maximum value listed in the table "TIRE LOAD LIMITSAT VARIOUS-COLD INFLATION PRESSURES" in TRA, and "INFLATION PRESSURE" in ETRTO.

As shown in FIG. 1, the tire 1 comprises a tread portion 2 defining a pair of tread edges Te, and a tread rubber 2G forming a ground contacting surface 2*s* of the tread portion 2.

Incidentally, the ground contacting surface 2*s* is a surface that comes into contact with a road surface when the tire 1 is rolling on the road surface, and the ground contacting surface 2*s* is curved in an arc shape which is convex toward the radially outside.

In this application, the tread edges Te mean the outer ends in the tire axial direction which come into contact with the road surface when the regular tire load is applied to the tire and the camber angle is set to a maximum value.

In the tire 1 of the present embodiment, the position of the tread edges Te correspond to the maximum tire section width positions.

The dimension in the tire axial direction between the tread edges Te is the tread width TW. The center in the tire axial direction between the tread edges Te corresponds to the tire equator C.

The tread rubber 2G includes a crown rubber 10 disposed in a crown region Cr including the tire equator C, and a pair of shoulder rubbers 11 disposed one on each side of the crown rubber 10 in the tire axial direction and extending to the tread edges Te, respectively.

The crown rubber 10 has a complex elastic modulus Ec*, and the shoulder rubbers 11 each have a complex elastic modulus Es*.

The complex elastic modulus Ec* is smaller than the complex elastic moduli Es*.

The crown region Cr where the crown rubber 10 is arranged is a region contacting with a road surface when running straight and when initiating rolling (leaning) or in the initial stage of rolling.

The crown rubber 10 having a relatively low complex elastic modulus makes the rigidity of the crown region Cr relatively low, and suppresses the reaction force when initiating rolling or in the initial stage of rolling. Thus, the tire 1 in the present embodiment can be improved in the initial stage nimbleness.

A shoulder region Sh where the shoulder rubber 11 is arranged is a region contacting with a road surface from the middle stage to late stage of rolling.

The shoulder rubber 11 having a relatively high complex elastic modulus can relatively increase the rigidity of the shoulder region Sh and provide stable handling.

Thus, the tire 1 in the present embodiment can be improved in the middle stage stability.

In this application, the complex elastic modulus E* and the after-mentioned loss tangent tan δ are measured using a dynamic viscoelasticity measuring device (EPLEXER series developed by GABO) under the following conditions in accordance with the provisions of JIS-K6394 "Rubber, vulcanized or thermoplastic—Determination of dynamic properties—General guidance".

Initial strain: 10%

Dynamic strain amplitude: +/−1%

Frequency: 10 Hz

Deformation mode: Stretch

Measurement temperature: 70 deg. C

Giving that ground contact areas (not shown) of the tire 1 occurred when the tire 1 under the regular state is placed on a flat horizontal surface at camber angles of 0 degrees, 10 degrees and 40 degrees, applying the regular tire load, are A0, A10 and A40, respectively, the following conditional expressions are satisfied:

$$0.3 =< (Ec^* \times A0)/(Es^* \times A40) =< 1.05, \text{ and}$$

$$0.95 =< A10/A0 =< 1.05$$

The ground contact area A0 approximates the ground contact area during straight running. The ground contact area A10 approximates the ground contact area in the initial stage of rolling.

The ground contact area A40 approximates the ground contact area after the middle stage toward late stage of rolling.

When the ground contacting surface 2*s* of the tread portion 2 is provided with concave portions or voids such as grooves, the ground contact areas A0, A10 and A40 mean the areas of a virtual ground contacting surface obtained by filling the concave portions.

Here, the "regular tire load" is a tire load which is, in a standard system including standards on which the tire is based, specified for the tire by the standards, for example, the "maximum load capacity" in JATMA, the maximum value listed in the table "TIRE LOAD LIMITS AT VARIOUS COLD INFLATION PRESSURES" in TRA, and the "LOAD CAPACITY" in ETRTO.

The ground contact area (A0, A10 and A40) is varied depending on the camber angle change and, for the rider, this acts as an indicator to understand the behavior of the motorcycle.

In the above conditional expressions, the term (Ec*×A0)/(Es*×A40) is the ratio of a product of the complex elastic modulus of the rubber mainly contacting with the ground during straight running and the ground contact area during straight running, to a product of the complex elastic modulus of the rubber mainly contacting with the ground after the middle stage of rolling and the ground contact area after the middle stage of rolling.

The inventor found that, by setting the ratio (Ec*×A0)/(Es*×A40) within a specific range, it becomes possible to reduce the rigidity change of the region contacting with the ground from the initial stage of rolling (including straight running) to the middle stage of rolling, and as a result, the transient property from straight running to the middle stage of rolling and thereafter can be improved.

Further, it was found that, by setting the ratio (Ec*×A0)/(Es*×A40) to 0.3 or more, it is possible to ensure the nimble handling in the initial stage of rolling at high levels in addition to the transient property.

Furthermore, it was found that, by setting the ratio (Ec*×A0)/(Es*×A40) to 1.05 or less, it is possible to maintain stable handling properties after the middle stage of rolling in addition to the transient property.

The ratio A10/A0 in the above conditional expressions indicates the change in the ground contact area when the running condition changes from straight running to the initial stage of rolling.

The inventor discovered that, by setting the ratio A10/A0 within a specific range, the behavior of the motorcycle in the initial stage of rolling is controlled and the initial stage nimbleness can be further improved.

By setting the ratio A10/A0 to 0.95 or more, a large ground contact area is ensured in the initial stage of rolling, and the initial stage nimbleness is improved.

Further, by setting the ratio A10/A0 to 1.05 or less, excessive increase in rigidity in the initial stage of rolling is suppressed, and as a result, deterioration of transient property is suppressed.

Therefore, the tire 1 according to the present disclosure has excellent initial stage nimbleness, middle stage stability, and transient property.

In order to improve the initial stage nimbleness, the ratio (Ec*×A0)/(Es*×A40) is preferably set to 0.4 or more, more preferably 0.5 or more.

In order to improve the middle stage stability, the ratio (Ec*×A0)/(Es*×A40) is preferably set to 1.0 or less, more preferably 0.95 or less, in combination with the above lower limit 0.4 or 0.5.

For example, the ratio (Ec*×A0)/(Es*×A40) is preferably set in a range from 0.4 to 1.0, more preferably from 0.5 to 0.95.

It is preferable that the ground contact areas A0 and A10 satisfy the following conditional expression: 0.95=<A10/A0=<1.00.

Thereby, the transient property is maintained at high levels. Thus, such limitation is preferably adopted for both the front wheel tire and the rear wheel tire of a motorcycle.

The tire 1 comprises a pair of sidewall portions 3 and a pair of bead portions 4. The sidewall portions 3 extend radially inwardly from both sides in the tire axial direction of the tread portion 2.

The bead portions 4 are connected to the sidewall portions 3, respectively, and each provided with a bead core 5 embedded therein.

Further, the tire 1 is provided with a carcass 6 and a tread reinforcing layer 7. The carcass 6 extends between the bead cores 5 of the bead portions 4 in a toroidal manner. The tread reinforcing layer 7 is disposed between the carcass 6 and the tread rubber 2G in the tread portion 2. The carcass 6 and the tread reinforcing layer 7 in the present embodiment can be formed with well-known structures.

The crown region Cr is defined as having a length Wc in the tire axial direction which is set in a range from 50% to 70% of the tread width TW.

The crown region Cr is centered on the tire equator C in the tire axial direction.

The shoulder regions Sh are each formed between the crown region Cr and one of the tread edges Te.

In this specification, the length Wc of the crown region Cr is defined between both ends 10*e* in the tire axial direction of the crown rubber 10 at the ground contacting surface 2*s*.

The complex elastic modulus Ec* of the crown rubber 10 is preferably not less than 4.5 MPa, more preferably not less than 5.0 MPa, but preferably not more than 6.5 MPa, more preferably not more than 6.0 MPa.

When the complex elastic modulus Ec* of the crown rubber 10 is 4.5 MPa or more, the rigidity essential for the crown region Cr is maintained, so stability during straight running is ensured.

When the complex elastic modulus Ec* of the crown rubber 10 is 6.5 MPa or less, the rigidity of the crown region Cr does not become excessively high, and nimble handling can be achieved.

The complex elastic modulus Es* of the shoulder rubber 11 is preferably not less than 6.5 MPa, more preferably not less than 7.0 MPa, but preferably not more than 8.5 MPa, more preferably not more than 8.0 MPa.

When the complex elastic modulus Es* of the shoulder rubber 11 is 6.5 MPa or more, stable handling can be achieved after the middle stage of rolling.

When the complex elastic modulus Es* of the shoulder rubber 11 is 8.5 MPa or less, the difference in rigidity between the crown region Cr and the shoulder regions Sh is suppressed from becoming excessively large, and transient change is kept small.

In order to improve the transient property, the difference (Es*−Ec*) between the complex elastic modulus Es* of each shoulder rubber 11 and the complex elastic modulus Ec* of the crown rubber 10 is preferably not less than 0.3 MPa, more preferably not less than 0.5 MPa, but preferably not more than 2.5 MPa, more preferably not more than 2.2 MPa.

Further, the loss tangent tan δ s of each of the shoulder rubbers 11 is preferably not less than 0.25, more preferably not less than 0.27, but preferably not more than 0.35, more preferably not more than 0.32.

When the loss tangent tan δ s is not less than 0.25 and not more than 0.35, gripping force of the tire 1 is appropriately increased after the middle stage of rolling, and stable handling can be achieved.

When the loss tangent tan δ s exceeds 0.35, there is a possibility that smoothness of rolling is lost.

The loss tangent tan δ c of the crown rubber 10 is preferably smaller than the loss tangent tan δ s of the shoulder rubber 11. Thereby, high initial cornering performance can be obtained.

From the viewpoint of maintaining high transient property, the difference (tan δ s−tan δ c) between the loss tangent tan δ s of each shoulder rubber 11 and the loss tangent tan δ c of the crown rubber 10 is preferably not less than 0.01, more preferably not less than 0.05, but preferably not more than 0.20, more preferably not more than 0.10.

The tread rubber 2G in the present embodiment is divided into three parts: a crown rubber 10 and a pair of shoulder rubbers 11.

In the present disclosure, however, the tread rubber 2G is not limited to such three-part structure. For example, the tread rubber 2G may include an additional base rubber (not shown) disposed radially inside the crown rubber 10 and the shoulder rubbers 11.

When measured at the tire equator C, the rubber thickness d1 of the crown rubber 10 is preferably not less than 50% of the overall thickness dA of the tread portion 2. Further, when measured at the midpoint cl of the axial length of the shoulder region Sh, the rubber thickness d2 of the shoulder rubber 11 is preferably not less than 50% of the overall thickness dB of the tread portion 2. These thicknesses are measured perpendicularly to the ground contacting surface 2*s* as shown in FIG. 1.

If the above-mentioned concave portions or voids such as grooves exist at the measuring position, the thickness d1, d2, dA, and dB is determined as measured from the above-mentioned virtual ground contacting surface.

It is preferable that the ground contact areas A10 and A40 satisfy the following conditional expression: 1.00=<A40/A10=<1.30.

Thereby, transient change from the initial stage of rolling to the middle stage of rolling and thereafter is kept even smaller.

In order to effectively derive such effect, it is more preferable to satisfy the following conditional expression: 1.00=<A40/A10=<1.25.

Handling operation of a motorcycle is largely affected by the front wheel tire 1F. For this reason, even after the middle stage of rolling, a certain degree of nimble handling is required.

Therefore, in the case of the front wheel tire 1F, it is more preferable that the ground contact areas A10 and A40 satisfy the following conditional expression:

$$1.00 =< A40/A10 =< 1.10.$$

As a result, it is possible to obtain ease of handling operation even after the middle stage of rolling.

On the other hand, driving force acts on the rear wheel tire 1R. For this reason, more stable handling is required after the middle stage of rolling. Therefore, in the case of the rear wheel tire 1R, it is more preferable that the ground contact areas A10 and A40 satisfy the following conditional expression:

$$1.15 =< A40/A10 =< 1.25.$$

As a result, after the middle stage of rolling, since a large gripping force is exerted, it is possible to obtain a great sense of stability.

Figure 2:
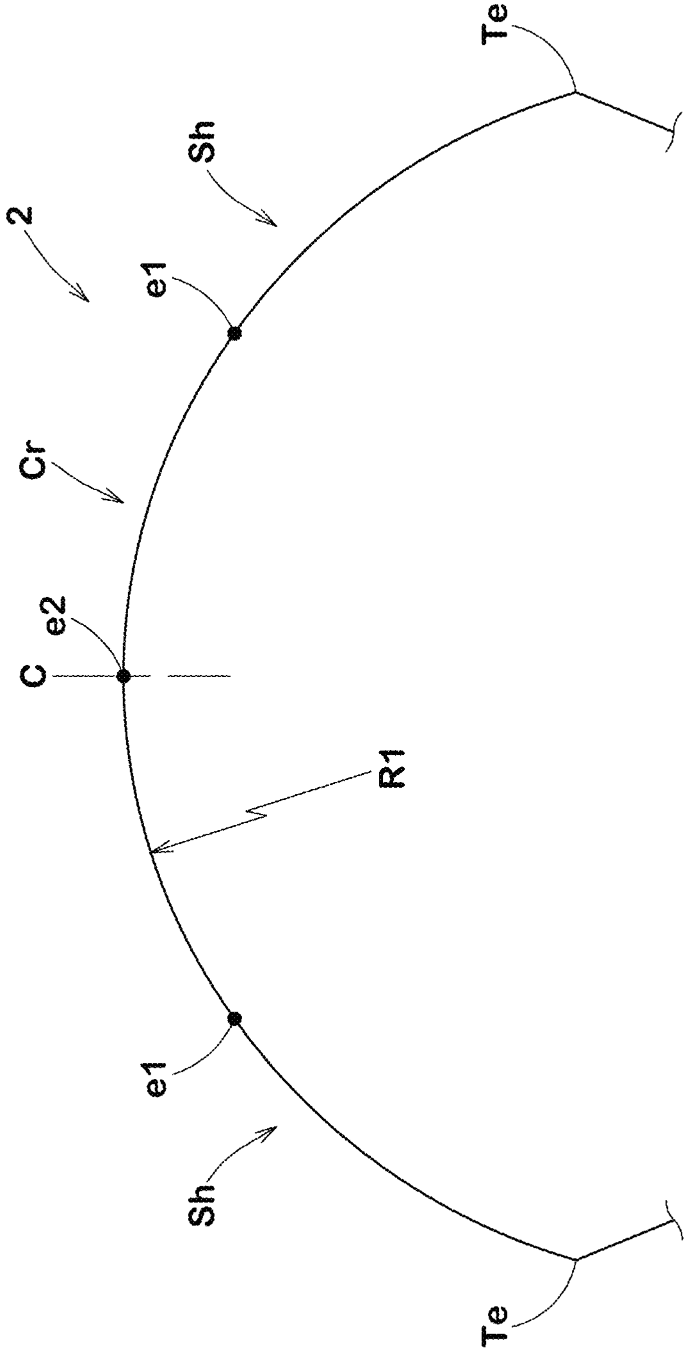
FIG. 2 is a diagram showing a profile of the tire shown in FIG. 1 in a tire-meridian cross section.

FIG. 2 shows a profile in the tire-meridian cross section, of the tread portion 2 under the regular state of the tire.

As shown, the radius of curvature R1 of the crown region Cr is preferably not less than 0.45 times, more preferably not less than 0.50 times, but preferably not more than 0.65 times, more preferably not more than 0.60 times the nominal sectional width W (not shown) of the tire 1.

In this application, the “nominal sectional width W” means that specified in Japanese Industrial Standards (JIS) D4203 “Motorcycle tyres-Designation and dimensions”, “4. Tire designation”, “4.2 Nominal sectional width”.

Further, the radius of curvature R1 is that of a circle passing through three points on the profile line: two points e1 and e1 corresponding to both ends in the tire axial direction of the crown region Cr, and one point e2 corresponding to the tire equator C.

When the radius of curvature R1 is not less than 0.45 times the nominal sectional width W of the tire 1, it is possible to obtain essential stability during straight. When the radius of curvature R1 is not more than 0.65 times the nominal sectional width W of the tire 1, the reaction force when initiating the rolling is suppressed and nimble handling can be obtained.

The tread portion 2 which realizes such ground contact areas A0, A10 and A40 can be manufactured by specially specifying the tire internal structure including the crown rubber 10, shoulder rubber 11, carcass 6, tread reinforcing layer 7, etc. and/or the profile of the tread portion 2, for example.

Motorcycle Tire Set

As described above, the tire 1 of the present embodiment can constitute a motorcycle tire set S consisting of a front wheel tire 1F (shown in FIG. 1) and a rear wheel tire 1R.

In each of the front wheel tire 1F and the rear wheel tire 1R in this case, the complex elastic modulus Ec* of the crown rubber 10 is smaller than the complex elastic modulus Es* of each of the shoulder rubbers 11, so the rigidity of the crown region Cr is reduced. This makes it easier to move toward the direction of rolling (leaning direction) of the motorcycle when turning, and nimble handling can be obtained.

When initiating the rolling, if the front wheel tire 1F starts leaning a little earlier than the rear wheel tire 1R starts leaning, then, in general, the motorcycle tends to oversteer, and as a result, nimble handling can be obtained.

On the other hand, if the rear wheel tire 1R starts leaning a little earlier than the front wheel tire 1F starts leaning, then, in general, the motorcycle tends to understeer, and as a result, it becomes difficult to obtain nimble handling.

In the rear wheel tire 1R on which a relatively large driving force is applied, it is preferred to reduce the difference between the complex elastic modulus Ec* of the crown rubber 10 and the complex elastic modulus Es* of each shoulder rubber 11 in order to ensure the smoothness of leaning of the motorcycle and thereby to improve the transient property.

From the viewpoint of ensuring smooth leaning while making the motorcycle tend to oversteer, it is preferable that the difference (Es*–Ec*) F between the complex elastic modulus Ec* of the crown rubber 10 and the complex elastic modulus Es* of each shoulder rubber 11 of the front wheel tire 1F is larger than the difference (Es*–Ec*) R between the complex elastic modulus Ec* of the crown rubber 10 and the complex elastic modulus Es* of each shoulder rubber 11 of the rear wheel tire 1R.

From the same viewpoint, it is preferable that the complex elastic modulus Ec* of the crown rubber 10 of the front wheel tire 1F is smaller than the complex elastic modulus Ec* of the crown rubber 10 of the rear wheel tire 1R.

Further, it is preferable that the complex elastic modulus Es* of each shoulder rubber 11 of the front wheel tire 1F is larger than the complex elastic modulus Es* of each shoulder rubber 11 of the rear wheel tire 1R.

Although not particularly limited, the difference of the complex elastic modulus difference (Es*–Ec*) F in the front wheel tire 1F from the complex elastic modulus difference (Es*–Ec*) R in the rear wheel tire 1R is preferably not less than 0.3 MPa, more preferably not less than 0.5 MPa, but preferably not more than 2.5 MPa, more preferably not more than 2.2 MPa.

While detailed description has been made of an especially preferable embodiment of the present disclosure, the present disclosure can be embodied in various forms without being limited to the illustrated embodiment.

Comparison Tests

Based on the structure shown in FIG. 1, motorcycle tires having specifications shown in Table 1 and Table 2 were experimentally manufactured as test tires (Comparative example tires Ref.1-Ref 6 and Working example tires Ex. 1-Ex.12).

The test tires were tested for the initial stage nimbleness, middle stage stability, and transient property.

The common specifications of the test tires and test method are as follows.

Tire size: 120/70ZR17 (front wheel tire), 180/55ZR17 (rear wheel tire)

Wheel rim size: MT3.50 (front wheel), MT5.50 (rear wheel)

Tire internal pressure: 250 kPa (front wheel tire), 290 kPa (rear wheel tire)

Initial Nimbleness, Middle Stage Stability, Transient Property Test

Using a motorcycle with a 900cc 4-stroke engine in which the same type of test tires were installed on the front and rear wheels, a test rider evaluated the initial stage nimbleness, middle stage stability and transient property during running on a dry asphalt road in a tire test course.

The transient property is easiness of driving when changing the camber angle.

The evaluation results are shown in Tables 1 and 2 in terms of scores based on Working example tire Ex.1 being 100, wherein the larger the numerical value, the better the result. If the total of the scores for the initial nimbleness, middle stage stability and transient property is 290 or less, such tires are considered to be rejected.

TABLE 1

| Tire | Ref. 1 | Ref. 2 | Ref. 3 | Ref. 4 | Ref. 5 | Ref. 6 | Ex. 1 | Ex. 2 | Ex. 3 |
|---|---|---|---|---|---|---|---|---|---|
| Ec*(MPa) | 6.5 | 4.5 | 4.5 | 4.5 | 4.5 | 4.5 | 2.5 | 4.5 | 4.5 |
| Es*(MPa) | 6.5 | 4.5 | 6.5 | 6.5 | 6.5 | 6.5 | 6.5 | 6.5 | 6.5 |
| A10/A0 | 1.00 | 1.00 | 0.90 | 1.10 | 1.00 | 1.00 | 1.00 | 1.00 | 1.00 |
| (Ec* × A0)/(Es* × A40) | 0.70 | 0.70 | 0.70 | 0.70 | 0.25 | 1.10 | 0.70 | 0.70 | 0.3 |
| tanδs | 0.30 | 0.30 | 0.30 | 0.30 | 0.30 | 0.30 | 0.30 | 0.30 | 0.30 |
| R1/W | 0.50 | 0.50 | 0.50 | 0.50 | 0.50 | 0.50 | 0.50 | 0.50 | 0.50 |
| Initial stage nimbleness [higher score is better] | 95 | 105 | 105 | 95 | 95 | 100 | 100 | 105 | 100 |
| Middle stage stability [higher score is better] | 100 | 85 | 100 | 100 | 100 | 95 | 100 | 105 | 105 |
| Transient property [higher score is better] | 90 | 95 | 85 | 90 | 85 | 85 | 100 | 105 | 105 |
| Total score | 285 | 285 | 290 | 285 | 280 | 280 | 300 | 315 | 310 |

TABLE 2

| Tire | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|
| Ec*(MPa) | 4.5 | 4.5 | 4.5 | 4.5 | 4.5 | 4.5 | 4.5 | 4.5 | 4.5 |
| Es*(MPa) | 6.5 | 6.5 | 10.5 | 6.5 | 6.5 | 6.5 | 6.5 | 6.5 | 6.5 |
| A10/A0 | 1.00 | 1.00 | 1.00 | 1.00 | 0.95 | 1.05 | 1.00 | 1.00 | 1.00 |
| (Ec* × A0)/(Es* × A40) | 1.05 | 0.70 | 0.70 | 0.70 | 0.70 | 0.70 | 0.70 | 0.70 | 0.70 |
| tanδs | 0.30 | 0.20 | 0.30 | 0.35 | 0.30 | 0.30 | 0.30 | 0.30 | 0.30 |
| R1/W | 0.50 | 0.50 | 0.50 | 0.50 | 0.50 | 0.50 | 0.45 | 0.65 | 0.70 |
| Initial stage nimbleness [higher score is better] | 100 | 100 | 105 | 105 | 103 | 100 | 110 | 100 | 100 |
| Middle stage stability [higher score is better] | 105 | 98 | 100 | 105 | 105 | 105 | 105 | 110 | 110 |
| Transient property [higher score is better] | 110 | 100 | 100 | 100 | 103 | 100 | 100 | 100 | 105 |
| Total score | 315 | 298 | 305 | 310 | 311 | 305 | 315 | 310 | 315 |

From the test results, it was confirmed that the tires according to the present disclosure were superior to the comparative example tires in the total score of the initial stage nimbleness, middle stage stability and transient property.

Statement of the Present Disclosure

The present disclosure is as follows.

[Present Disclosure 1]

A motorcycle tire comprising: a tread portion having a pair of tread edges, and a tread rubber forming a ground contacting surface of the tread portion, wherein

- the tread rubber includes a crown rubber disposed in a crown region including the tire equator, and a pair of shoulder rubbers disposed one on each side of the crown rubber in the tire axial direction, and extending to the tread edges, respectively,
- a complex elastic modulus Ec* of the crown rubber is smaller than a complex elastic modulus Es* of each of the shoulder rubbers, and
- when the motorcycle tire under a regular state in which the tire is mounted on a regular rim and inflated to a regular internal pressure, is placed on a flat horizontal surface, by applying a regular tire load, ground contact areas A0, A10 and A40 of the tire at tire camber angles of 0 degrees, 10 degrees and 40 degrees, respectively, satisfies the following conditional expressions:

$$0.3 <= (Ec^* \times A0)/(Es^* \times A40) <= 1.05; \text{ and}$$

$$0.95 <= A10/A0 <= 1.05.$$

[Present Disclosure 2]

The motorcycle tire according to Present Disclosure 1, wherein

- the complex elastic modulus Ec* of the crown rubber is 4.5 to 6.5 MPa.

[Present Disclosure 3]

The motorcycle tire according to Present Disclosure 1 or 2, wherein

- the complex elastic modulus Es* of each of the shoulder rubbers is 6.5 to 8.5 MPa.

[Present Disclosure 4]

The motorcycle tire according to any one of Present Disclosures 1 to 3, wherein

- a loss tangent tan δ s of each of the shoulder rubbers is 0.25 to 0.35.

[Present Disclosure 5]

The motorcycle tire according to any one of Present Disclosures 1 to 4, wherein

- in a tire-meridian cross section of the tire under the regular state, a radius of curvature of the crown region is 0.45 to 0.65 times a nominal sectional width of the tire.

[Present Disclosure 6]

The motorcycle tire according to any one of Present Disclosures 1 to 5, wherein

- a length in the tire axial direction of the crown region is 50% to 70% of a tread width.

[Present Disclosure 7]

The motorcycle tire according to any one of Present Disclosures 1 to 6, wherein the following conditional expression is satisfied:

$$0.95 =< A10/A0 =< 1.00.$$

[Present Disclosure 8]

The motorcycle tire according to any one of Present Disclosures 1 to 7, wherein the following conditional expression is satisfied:

$$1.00 =< A40/A10 =< 1.30.$$

[Present Disclosure 9]

The motorcycle tire according to any one of Present Disclosures 1 to 8, wherein the following conditional expression is satisfied:

$$1.00 =< A40/A10 =< 1.25.$$

[Present Disclosure 10]

A motorcycle tire set consisting of a front wheel tire and a rear wheel tire which are the motorcycle tires according to any one of Present Disclosures 1 to 9, wherein in each of the front wheel tire and the rear wheel tire, the complex elastic modulus Ec* of the crown rubber is smaller than the complex elastic modulus Es* of each of the shoulder rubbers, and a difference (Es*–Ec*) F between the complex elastic modulus Ec* of the crown rubber and the complex elastic modulus Es* of each shoulder rubber of the front wheel tire is larger than a difference (Es*–Ec*) R between the complex elastic modulus Ec* of the crown rubber and the complex elastic modulus Es* of each shoulder rubber of the rear wheel tire.

DESCRIPTION OF THE REFERENCE SIGNS

1 Motorcycle tire
10 Crown rubber
11 Shoulder rubber
2G Tread rubber
Cr Crown region
Te Tread edge

The invention claimed is:

1. A motorcycle tire set consisting of a front wheel tire and a rear wheel tire, each of the front wheel tire and the rear wheel tire comprising:

a tread portion having a pair of tread edges; and a tread rubber forming a ground contacting surface of the tread portion, wherein the tread rubber includes a crown rubber disposed in a crown region including the tire equator, and a pair of shoulder rubbers disposed one on each side of the crown rubber in the tire axial direction, and extending to the tread edges, respectively, a complex elastic modulus Ec* of the crown rubber is smaller than a complex elastic modulus Es* of each of the shoulder rubbers, and when the motorcycle tire under a regular state in which the tire is mounted on a regular rim and inflated to a regular internal pressure, is placed on a flat horizontal surface, by applying a regular tire load, ground contact areas A0, A10 and A40 of the tire at tire camber angles of 0 degrees, 10 degrees and 40 degrees, respectively, satisfies the following conditional expressions:

$$0.3 <= (Ec^* \times A0)/(Es^* \times A40) <= 1.05; \text{ and}$$

$$0.95 <= A10/A0 <= 1.05,$$

wherein in each of the front wheel tire and the rear wheel tire, the complex elastic modulus Ec* of the crown rubber is smaller than the complex elastic modulus Es* of each of the shoulder rubbers, and a difference (Es *–Ec*) F between the complex elastic modulus Ec* of the crown rubber and the complex elastic modulus Es* of each shoulder rubber of the front wheel tire is larger than a difference (Es *–Ec*) R between the complex elastic modulus Ec* of the crown rubber and the complex elastic modulus Es* of each shoulder rubber of the rear wheel tire.

2. The motorcycle tire set according to claim 1, wherein the complex elastic modulus Ec* of the crown rubber is 4.5 to 6.5 MPa.

3. The motorcycle tire set according to claim 2, wherein a loss tangent tan δ s of each of the shoulder rubbers is 0.25 to 0.35.

4. The motorcycle tire set according to claim 2, wherein in a tire-meridian cross section of the tire under the regular state, a radius of curvature of the crown region is 0.45 to 0.65 times a nominal sectional width of the tire.

5. The motorcycle tire set according to claim 2, wherein a length in the tire axial direction of the crown region is 50% to 70% of a tread width.

6. The motorcycle tire set according to claim 2, wherein the following conditional expression is satisfied:

$$0.95 =< A10/A0 =< 1.00.$$

7. The motorcycle tire set according to claim 2, wherein the following conditional expression is satisfied:

$$1.00 =< A40/A10 =< 1.30.$$

8. The motorcycle tire set according to claim 1, wherein the complex elastic modulus Es* of each of the shoulder rubbers is 6.5 to 8.5 MPa.

9. The motorcycle tire set according to claim 8, wherein a loss tangent tan δ s of each of the shoulder rubbers is 0.25 to 0.35.

10. The motorcycle tire set according to claim 8, wherein in a tire-meridian cross section of the tire under the regular state, a radius of curvature of the crown region is 0.45 to 0.65 times a nominal sectional width of the tire.

11. The motorcycle tire set according to claim 8, wherein a length in the tire axial direction of the crown region is 50% to 70% of a tread width.

12. The motorcycle tire set according to claim 8, wherein the following conditional expression is satisfied:

$$0.95 =< A10/A0 =< 1.00.$$

13. The motorcycle tire set according to claim 8, wherein the following conditional expression is satisfied:

$$1.00 =< A40/A10 =< 1.30.$$

14. The motorcycle tire set according to claim 1, wherein a loss tangent tan δ s of each of the shoulder rubbers is 0.25 to 0.35.

15. The motorcycle tire set according to claim 1, wherein in a tire-meridian cross section of the tire under the regular state, a radius of curvature of the crown region is 0.45 to 0.65 times a nominal sectional width of the tire.

16. The motorcycle tire set according to claim 1, wherein a length in the tire axial direction of the crown region is 50% to 70% of a tread width.

17. The motorcycle tire set according to claim 1, wherein the following conditional expression is satisfied:

$$0.95 =< A10/A0 =< 1.00.$$

18. The motorcycle tire set according to claim 1, wherein the following conditional expression is satisfied:

$$1.00 =< A40/A10 =< 1.30.$$

19. The motorcycle tire set according to claim 1, wherein the following conditional expression is satisfied:

$$1.00 =< A40/A10 =< 1.25.$$

* * * * *